United States Patent [19]

Ronn

[11] 4,230,546

[45] Oct. 28, 1980

[54] METHOD OF MOLECULAR SPECIE ALTERATION BY NONRESONANT LASER INDUCED DIELECTRIC BREAKDOWN

[75] Inventor: Avigdor M. Ronn, Great Neck, N.Y.

[73] Assignee: Research Foundation of the City University of New York, New York, N.Y.

[21] Appl. No.: 825,987

[22] Filed: Aug. 19, 1977

[51] Int. Cl.$^2$ .............................................. B01J 1/10
[52] U.S. Cl. ........................ 204/157.1 R; 204/158 R; 204/162 R; 204/DIG. 11
[58] Field of Search ............... 204/DIG. 11, 157.1 R, 204/158 R, 162 R

[56] References Cited

U.S. PATENT DOCUMENTS

| | | | |
|---|---|---|---|
| 4,012,301 | 3/1977 | Rich et al. | 204/158 R |
| 4,063,896 | 12/1977 | Merritt et al. | 204/DIG. 11 |
| 4,070,261 | 1/1978 | Merritt et al. | 204/DIG. 11 |
| 4,075,072 | 2/1978 | Merritt | 204/DIG. 11 |

OTHER PUBLICATIONS

Verdieck et al., Chemical Communications (1969), p. 226.
Rockwood et al., Chemical Physics Letters, vol. 34, No. 3, Aug. 1, 1975, pp. 542-545.

*Primary Examiner*—Howard S. Williams
*Attorney, Agent, or Firm*—Watson, Leavenworth, Kelton & Taggart

[57] ABSTRACT

Irradiation of a molecular specie by itself or in the presence of a secondary material at a pressure above a threshold value for the particular system by a laser of predetermined minimum power and having a frequency displaced from an absorption line of the specie causes severance of the weakest bond and a yield of products containing at least one dissociative fragment from said specie. A Rogowski type TEA $CO_2$—$N_2$—He laser has been used successfully on a wide variety of molecular species. Solid, liquid and gaseous end products have been obtained depending upon the starting materials. When solids have been produced they are in the form of microfine particles or microfine aggregates. A neodymium glass laser has also been used successfully.

13 Claims, 1 Drawing Figure

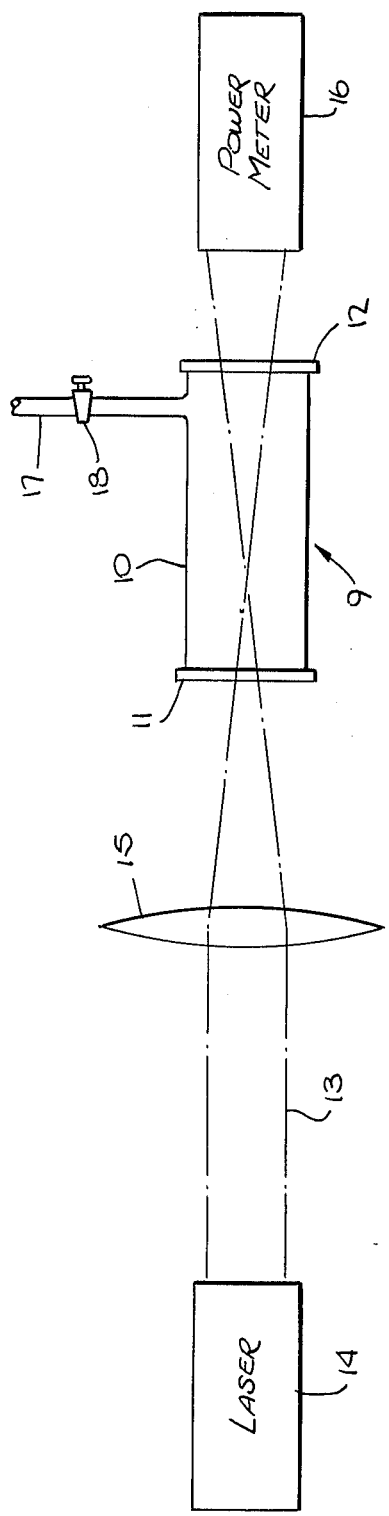

METHOD OF MOLECULAR SPECIE ALTERATION BY NONRESONANT LASER INDUCED DIELECTRIC BREAKDOWN

The Government has rights in this invention pursuant to Contract No. E(04-3)-1107 awarded by the U.S. Energy Research and Development Administration.

The present invention relates to the alteration of a molecular specie by irradiation with the output from a laser and more particularly to the production of a stable end product containing at least one dissociative fragment from said specie.

The irradiation of targets with a laser beam has been described in various patents as being useful for the purpose of altering biological and chemical activity of a molecular specie or for isotope separation. In each instance the described phenomenon has been predicated on exciting electronic vibrational and/or rotational states of the irradiated specie which entails using a laser whose beam frequency matches an absorption line of the specie, giving rise to photon or multiphoton absorption. Thus, the Pratt, Jr. U.S. Pat. No. 3,941,670, issued Mar. 2, 1976, describes the deactivation of dry Bacillus subtilis spores by projecting an unfocused $CO_2$ laser beam of 23 watts power upon the spore sample for 1/10 of a second. According to said patent the laser excites vibrational and rotational states of the irradiated spores with the attendant large amplitudes of induced oscillation in the spores being sufficient to disrupt such macromolecules in a physical or mechanical manner without burning.

In Kaldor U.S. Pat. No. 4,000,051, issued Dec. 28, 1976, the prior art relating to isotope separation is reviewed and the invention therein is described as based upon photon absorption, a phenomenon requiring, as observed above, irradiation of a specie with light at a frequency that matches an absorption line, in this case an absorption line of an isotope of interest in said specie. The various specie discussed in said Kaldor patent are assumed to be gaseous. In Bernstein U.S. Pat. No. 4,032,419, issued June 28, 1977, a compound in the solid phase is similarly irradiated for isotope separation.

When a gas is irradiated with an infrared laser beam it is possible under appropriate conditions to induce dielectric breakdown in such gas. In fact, with sufficient laser power, dielectric breakdown will occur within any gas which is maintained in a collision dominated pressure regime. Such breakdown is normally attributable to the very high AC electric field generated by the intense infrared radiation and can be avoided by carefully controlling gas pressure and irradiation intensities. In isotope separation processes dielectric breakdown is diliberately avoided by operating below the threshold pressure for such breakdown.

Processes relying upon photon absorption and resonant phenomena, while advantageous for the specific purposes for which such processes have been previously utilized, have in common certain limitations. The basic premise of matching the frequency of the laser to the absorption line or lines of a specie limits such processes to those materials for whose absorption line frequencies there exists a known laser with matching output. At present, laser devices are not available to cover the entire spectrum.

With the foregoing in mind it is an object of the present invention to provide a laser induced dissociation process which has been freed from the restraints heretofore imposed. It is a further object to provide a process for producing stable products from dissociated fragments obtained from dissociative molecular species by laser irradiation which is characterized by nonresonant, as opposed to resonant, operation.

In accordance with one aspect of the present invention there is provided a method for obtaining a stable end product comprising in combination the steps of irradiating a quantity of a dissociative molecular specie with the output from a laser having a predetermined power level and a frequency displaced from any absorption frequencies of said specie, said power level and the extent of said irradiation being selected to cause dielectric breakdown in said specie accompanied by severance of the weakest bond and at least temporary formation of at least two fragments, and extracting from the products of said dielectric breakdown a stable end product containing one of said fragments.

The invention will be better understood after reading the following detailed description of the presently preferred embodiments thereof with reference to the appended drawing, in which the single figure illustrates diagrammatically the arrangement of typical apparatus for performing the method that constitutes the subject of the present invention.

Referring to the drawing, the specimen to be irradiated is confined within a chamber 9 having a central section 10 whose opposite ends are closed by suitable windows 11 and 12 which are transparent to the laser beam 13 produced by laser 14 focused through lens 15 within chamber 9. A power meter 16 is provided for adjusting the laser output to the desired output power level. A pipe 17 controlled by a suitable gas cock 18 is joined to the chamber 9 for initially enabling the chamber to be evacuated and subsequently filled with the material to be irradiated.

A series of successful tests of the subject process were implemented using a Rogowski type TEA (transverse electric atmospheric) $CO_2$-$N_2$-He laser as the laser 14 capable of 1 to 2 Joule output (single line) at 1 to 5 pps repetition rate. For one group of tests the chamber 9 was typically formed with a glass central section 10 cm. long and 2.5 cm. in internal diameter, while windows 11 and 12 were formed from NaCl or ZnSe. Lens 15 had a 5" focal length and was cnstructed of ZnSe. The laser 14 was capable of producing beam pulses having a duration ranging from 0.2 to 1 microseconds. The particular laser output frequency was tunable across the P and R branches of both the 9.6 micron and 10.6 micron $CO_2$ bands by means of a gold coated copper grating terminating one end of the optical cavity.

After introducing a sample into the chamber 9, it was irradiated with a particular laser line for a predetermined number of pulses. Product analysis was carried out by standard infrared absorption spectroscopy and mass spectrometry. In addition, in the case of starting samples of OCS, the resulting products can easily be determined from simple PVT measurements and micro weighing techniques. The results will be found tabulated in Table I below wherein all examples except numbers 3, 9, 10, 11 and 12 were obtained using a chamber with the above dimensions. The examples 3, 9, 10, 11 and 12 were based upon chambers of different size.

TABLE I

| EX | SPECIE | LASER FREQUENCY | ENERGY[5] | NO. OF PULSES | GAS[6] PRES.[6] (torr) | IDENTIFIED PRODUCTS |
|----|--------|-----------------|-----------|---------------|------------------------|---------------------|
| 1  | OCS | 944.15 cm$^{-1}$ | 1 | 3200 | 60 | CO & S |
| 2  | OCS | P(20) 10.6μ | 1.7 | 1 | 38 | CO & S |
| 3  | OCS | 1.06μNd$^{+3}$ | 0.3 | 1 | 90 | CO & S |
| 4  | $SF_6$ | P(20) 9.6μ | 1 | 200-300 | ≧ 10 | NONE OBSERVED |
| 5  | $SF_6 + H_2$ | P(20) 9.6μ | 2.5 | ≈1000 | 40/40 | HF & $SF_4$ & S |
| 6  | $SF_6 + H_2$ | P(20) 9.6μ | 2.5 | ≈3000 | 30/90 | HF & S |
| 7  | $Fe(C_5H_5)_2$ | P(20) 10.6μ | 1.7 | | | Fe |
| 8  | $Mo(CO)_6$ | P(20) 10.6μ | 1.7 | | | Mo & CO |
| 9  | $CrO_2Cl_2$ | P(20) 10.6μ | 1.3 | ≈200 | 1 | NONE OBSERVED |
| 10 | $CrO_2Cl_2$ | P(20) 10.6μ | 1.3 | ≈200 | 15 | BROWN SOLID[1] |
| 11 | $CrO_2Cl_2 + H_2$ | P(20) 9.6μ | 2.5 | 1 | 15/15 | $Cr_2O_3$ & HCl[2] |
| 12 | $CrO_2Cl_2 + H_2$ | P(20) 9.6μ | 2.5 | 1 | 15/30 | $Cr_2O_3$ & HCl |
| 13 | $CH_2F_2$ | P(20) 10.6μ | 1.5 | ≈500 | 15 | $C_2F_4$ & $H_2$ |
| 14 | $C_6H_6$ | P(20) 10.6μ | 2.0 | ≈500 | 25 | $C_2H_2$ & C |
| 15 | $CH_3F$ | P(20) 10.6μ | 1.7 | | 22 | |
| 16 | $CHF_3$ | P(20) 10.6μ | 1.7 | ≈300 | 22 | MIXED GASES |
| 17 | $PH_3$ | P(20) 10.6μ | 1.2 | ≈200 | 1-4 | P & $H_2$ |
| 18 | $CH_3I$ | P(20) 10.6μ | 1.5 | ≈500 | | $C_2H_2$ & $I_2$[3] |
| 19 | $CH_3I + O_2$ | P(20) 10.6μ | 1.5 | 1 | 18/30 | $CO_2$ & $H_2O$ & $I_2$[4] |

Notes to Table I
[1] Assumed to be $CrO_2$ or $CrO_4$ or both.
[2] Plus some unreacted material and non-identified products.
[3] All of the iodine was in solid form.
[4] Some iodine solid, remainder in solution.
[5] Energy is in Joules per pulse.
[6] Where two numbers are separated by a slash (/) the first specifies the pressure of the principal specie and the second the pressure of the scavenger.

For successful and reproducible laser induced dielectric breakdown, the pressure of the gas being irradiated, the scavenger pressure where a scavenger is employed as described hereinafter, and the power duration of the exciting pulse must be determined for each and every material. However, such parameters can be determined empirically quite readily when the basic principles are understood as described hereinbelow. It has been found that threshold pressure conditions are intimately linked to the polarizability and dipole moment of the gas specie and decrease as the latter increase. In all species that have been studied to date, laser induced dielectric breakdown occurs at some specific pressure which is related to laser power and molecular parameters. As noted previously, laser induced dielectric breakdown is a nonresonant interaction of radiation and matter and does not require a matched absorption line in the specie under study.

In direct decomposition tests performed individually with each of $Fe(C_5H_5)_2$, $CrO_2Cl_2$, $UF_6$, $Mo(CO)_6$, and OCS, as well as many organic compounds, as the sole material in chamber 9, discrete particulate formation was observed. Typical examples are included in Table I. It was determined that ferrocene decomposed leaving substantial deposits of iron; molybdenum hexacarbonyl decomposed to form molybdenum metal and carbon monoxide; and carbonyl sulfide decomposed to form carbon monoxide and solid sulfur. In the case of OCS, decomposition of a 60 torr sample was also accomplished in the presence of 150 torr of argon and was carried to completion with 3200 laser pulses. Defining "photon utilization factor" as the number of photons injected into the sample divided by the total number of molecules dissociated, such factor was ascertained for the decomposition of OCS at 60 torr but without the addition of argon based on 3200 laser pulses, as 350. This may be compared with the photon utilization factors for $UF_6$ set forth in Table II below.

The nonresonant relationship, which as stated previously has been avoided in multiphoton absorption precedures for laser isotope separation due to its nonselective nature, presents a selectivity of its own kind. As opposed to the absorption procedures in which a particular rotational line in a specific vibrational band of a specific isotopic specie is excited at low pressure and a unique isotopic specie is dissociated presumably unimolecularly, the laser induced dielectric breakdown process described herein employs high pressure, is nonselective from the standpoint of its excitation spectrum but is specific in its product formation in a thermodynamic sense. In a simple system such as that involving OCS, CO and sulfur, it is quite clear that the weakest bond in the system is the C-S bond and that solid S and carbon monoxide will not backreact significantly during usual processing times. In this instance the fragmented system, CO and S, is thermodynamically preferred. The same is true, but even more so, in the case of ferrocene and molybdenum hexacarbonyl. The dielectric breakdown technique may thus be construed as selective in the sense of seeking out the weakest bond in the system for primary dissociation while product formation is essentially thermodynamically controlled. With respect to organic compounds, it is believed that with sufficient power and time carbon can always be separated regardless of the compound and without the aid of a scavenger or other secondary material.

When the system involved is much more complex such as encountered with $SF_6$, careful consideration must be given to the recombination processes of the fragments and to the need for appropriate scavenging, e.g., $H_2$ in the case of $SF_6$. Previous workers concentrating on laser isotope separation have concluded that the $SF_6$ system, when dissociated by multiphoton absorption in the presence of $H_2$ shows good isotopic selectivity (better than a factor of 3000) at low pressures. At higher pressure, above 1 torr, less isotopic selectivity is shown and further degradation progresses with increasing pressure due to V—V scrambling collisions. Additionally, a number of products have been identified in the irradiated samples, $SOF_2$ and $SF_4$ being the major species. In comparison, in accordance with the present invention, when a high pressure mixture of $SF_6$ and $H_2$ at 1:3 ratio is subjected to laser induced dielectric breakdown and subsequent scavenging a very clear-cut chemical reaction takes place, namely:

$$SF_6 + 3 H_2 \rightarrow 6HF + S$$

Clearly, the products are thermodynamically preferred over the reactants, and scavenging of all fluorine atoms is easily effected. Although no selectivity in terms of the isotopes of sulfur is observed, none is expected due to the totally nonspecific nature of the dissociation process in $SF_6$.

The subject process has also been employed successfully with $UF_6$ and $H_2$ where laser induced dielectric breakdown acts as a precursor to the consequent chemical scavenging of the fluorine fragment with molecular $H_2$ with subsequent formation of suspended particulates of $UF_5$. Because of the nature of $UF_6$, the chamber 9 was constructed of Monel rather than glass and equipped with ZnSe windows for laser entrance and exit. Although not shown in the subject drawings, the chamber was provided with viewing windows at right angles to the laser axis. NaCl as well as ZnSe windows have been found satisfactory. Using a $CO_2$ laser tuned to the P(20) line of the 10.6 micron branch, the results tabulated in Table II were obtained. Infrared spectroscopy was used to ascertain the disappearance of the $UF_6$ and the appearance of the HF in the cell while identification of two separately prepared samples of $UF_5$ was ascertained by Schwarzkopf Microanalytical Laboratory yielding identical uranium fluroine ratios fitting the molecular formula $UF_5$.

TABLE II

| EX | Pressure in torr $UF_6$ | $H_2$ | Laser power in Joules/ pulse | Number of Laser pulses | Amt. of solid yield (mg) | Photon utilization factor (R) |
|---|---|---|---|---|---|---|
| 20 | 80 | 20 | 1.5 | 6000 | 50 | 612 |
| 21 | 80 | 20 | 1.5 | 6000 | 51 | |
| 22 | 72 | 36 | 1.75 | 6000 | 49 | 750 |
| 23 | 83 | 10 | 1.75 | 6000 | 23 | 1600 |
| 24 | 69 | 36 | 1.7 | >8000 | 422 | Not determined |

In order to relate the quantity of solid produced, the volume of the specimen chamber was approximately 40 cc. for examples 20, 21, 22 and 23, and 413.5 cc. for example 24. The photon utilization factory (R) was as defined previously and is expressed in eV/$UF_5$ molecules.

Table I above contains only a partial tabulation of the successful tests performed with the subject process. Only representative examples have been included to demonstrate the wide application of the basic principles. At the outset, we can state with assurance that dielectric breakdown can be achieved in all materials, whether gaseous, liquid or solid, by using sufficient laser power above a discrete threshold pressure. Although it is possible to achieve some type of fragmentation of particular species by irradiating with a laser tuned to resonance with an absorption line, weak bond severance can be achieved in all materials under nonresonant conditions. In those cases where fragmentation can be brought about in the same specie both under resonant and nonresonant conditions, the latter will occur with less power, generally as much as 50% less.

Comparing the examples of 1 to 3 in Table I employing OCS, it will be observed that satisfactory results have been obtained with a neodymium glass laser as well as with the Rogowski type TEA $CO_2$-$N_2$-He laser, the latter being used in all of the other examples. For purpose of comparison, the absorption line of OCS corresponds to the frequency of the P(22) 9.6$\mu$ line of the $CO_2$ laser. A comparison of examples 1 and 2 shows clearly the inverse relationship between laser energy and gas pressure.

Examples 4 and 5 of Table I deal with a situation where a secondary material is required, in this instance functioning as a scavenger. Although dielectric breakdown was achieved in example 4, the fragments were unstable, and recombined such that no observable change could be detected. When $H_2$ was added to $SF_6$ in equal proportions, the yield was HF and $SF_4$ and S. If sulfur is the desired end product, then the hydrogen, a secondary material, may be viewed more specifically as a scavenger for binding up part of the fluorine. However, if HF is the desired end product then the hydrogen, although not a "scavenger", is still an active secondary material introduced to combine with the liberated fluorine to form the desired end product. Finally, it should be observed the $SF_4$ is an end product which is essentially a residual material.

Varying the stoichiometry and the extent of irradiation will give rise to different end products. Thus, when the quantity of hydrogen as well as the number of pulses are increased in example 6, only HF and S are produced. Obviously, this principle can be extended to other species.

It must be understood that the identified end products listed under that heading in Table I do not necessarily represent all the materials present in the sample chamber at the end of the test. Rather, the tabulated data represents only those products that were specifically identified. That is, in example 11, $H_2O$ must have been present at the end of the test. in addition to some unreacted material or $CrO_2Cl_2$ that had recombined. In example 12, $H_2O$ must have been present, while in example 14, free $H_2$ had to be present at the end of the test.

The solids produced by the subject process may be described most aptly as aggregations of microfine particulates which are microfine in their own right, that is, no greater than 50 microns in diameter. Consequently, the subject process is well suited to producing microfine particulates.

Examples 9 and b 10 illustrate the effect of pressure on the results. In example 9, with a pressure of 1 torr, no observable solid products were obtained. When the pressure was raised to 15 torr a brown solid was observed to have been produced. Such solid was not analyzed to determine its composition but it can be assumed that it was $CrO_2$ or $CrO_4$ or both. Examples 11 and 12 demonstrate how adding a secondary material such as hydrogen causes a change in the yield. Examples 18 and 19 also illustrate the effect of adding a secondary material.

In the case of example 7, the end product was only checked to determine the presence of solid Fe particles. Unidentified hydrocarbons could also have been present.

Examples 20 through 24 in Table II deal with $UF_6$ as the starting material with $H_2$ as the added secondary material. As mentioned above in connection with the examples tabulated in Table I, additional end products are present in the test chamber at the end of the test. Thus, in example 23, there must have been present at the end of the test $UF_6$ that had recombined. Hence, the lower yield of solid $UF_5$ which appears, as mentioned previously, as fine particles smaller than 50 microns.

Examples 22 and 24 demonstrate that efficient product production is essentially independent of cell volume. The cell volume figures mentioned above represent measured or calculated volumes of the chamber 9 plus that of any tubing between the chamber and the gas cock. In other words, the total volume of gas available for the reaction. It must be noted here that the volume of the small chamber used in examples 20 through 23, inclusive, has only been estimated while the volume of the chamber used in example 24 was accurately determined.

It has also been determined that the dielectric breakdown phenomenon can be implemented in any shape vessel or chamber. Chambers formed from glass, monel and aluminum have all functioned satisfactorily. Of course, it is assumed that the chamber windows are transparent to the laser beam. In addition, the materials must be chosen so that they are effectively inert insofar as the particular reactive process is concerned unless it is desired that the chamber wall constitute the secondary material. Thus, glass may be used in contact with OCS but not in contact with $UF_6$ for which both monel and aluminum chambers have been used satisfactorily.

In conclusion, the subject invention may be looked upon as a powerful tool opening a vast vista of potential with respect to new product production and more efficient production of existing products. In the field of microfine particle production it can be used to produce substances in microfine form which either could not be produced in such form heretofore, or could so only at considerable expense.

As used in the subject specification, it should be understood that the term "gas" or "gaseous" is intended to include vapors and is not limited to only those materials that exist as a gas under normal conditions of temperature and pressure.

Having described the subject invention with reference to the presently preferred embodiments thereof, it will be understood by those skilled in the art to which the subject invention pertains that various changes in the apparatus and process steps can be effected without departing from the true spirit of the invention as defined in the appended claims. For example, the lens 15 may be omitted where concentration of the laser beam is deemed unnecessary. Other laser devices may be used. Where effective pressure coincides with atmospheric pressure, the closed cell can be omitted, and so forth.

What is claimed is:

1. A method for obtaining a stable end product comprising in combination the steps of confining a quantity of a dissociative molecular specie in a gaseous state at a pressure sufficient to maintain said specie in a collision dominated regime, irradiating said specie with the output from a laser in discrete pulses having a predetermined power level per pulse and having a frequency displaced from any absorption frequencies of said specie and any other specie that may be present, said power level being selected in relation to said pressure to cause with each output pulse of said laser nonresonant dielectric breakdown in said specie accompanied by severance of the weakest bond and at least temporary formation of at least two fragments from said specie, extracting from the products of said dielectric breakdown a stable end product containing one of said fragments, and continuing said irradiation of said specie until a desired quantity of said stable end product has been formed.

2. A method according to claim 1, wherein said specie is selected from the group consisting of OCS, $SF_6$, $UF_6$, $Fe(C_5H_5)_2$, $Mo(CO)_6$, $CrO_2Cl_2$, $CH_2F_2$, $C_6H_6$, $PH_3$ and $CH_3I$.

3. A method according to claim 1, wherein said irradiation of said specie is accomplished with said specie mixed with a secondary material also in a gaseous state and confined therewith during said irradiation step in a collision dominated pressure regime, said secondary material being adapted to combine thermodynamically and selectively with one of said fragments.

4. A method according to claim 3, wherein said specie is selected from the group consisting of $SF_6$, $UF_6$, and $CrO_2Cl_2$; and said secondary material is $H_2$.

5. A method according to claim 3 wherein said specie is $CH_3I$ and said secondary material is $O_2$.

6. A method according to claim 1, wherein the output of said laser is pulsed single line.

7. A method according to claim 6, wherein said specie is OCS and said irradiation is continued until substantially all of said specie has been converted to sulfur and carbon monoxide.

8. A method according to claim 6, wherein said irradiation of said specie is accomplished with said specie mixed with a secondary material which is adapted to combine thermodynamically and selectively with one of said fragments.

9. A method according to claim 8, wherein said specie is $UF_6$, said secondary material is $H_2$, and said irradiation is continued until substantially all of said specie has been converted to $UF_5$ and hydrogen fluoride.

10. A method according to claim 1, wherein said one of said fragments exists in a solid state under normal conditions of temperature and pressure, said laser induced dielectric breakdown is accomplished under conditions yielding said one of said fragments in the form of microfine particles, and said particles are collected.

11. A method according to claim 10, wherein the average particle size of said particles is below 50 microns.

12. A method according to claim 10, wherein said specie is OCS and said irradiation is continued until substantially all of said specie has been converted to sulfur and carbon monoxide.

13. A method according to claim 10, wherein the output of said laser is pulsed single line.

* * * * *

UNITED STATES PATENT AND TRADEMARK OFFICE
CERTIFICATE OF CORRECTION

PATENT NO. : 4,230,546
DATED : October 28, 1980
INVENTOR(S) : Avigdor M. Ronn

It is certified that error appears in the above–identified patent and that said Letters Patent are hereby corrected as shown below:

Column 1, line 56, "diliberately" should read --deliberately--.

In Table I for example 18, under the column headed "GAS PRES." delete "$C_2H_2$ & $I_2^{(3)}$" and substitute --25--; under the column headed "IDENTIFIED PRODUCTS" insert --$C_2H_2$ & $I_2^{(3)}$--.

Column 6, line 51, "9 and b 10" should read --9 and 10--.

Signed and Sealed this

Third Day of March 1981

[SEAL]

Attest:

RENE D. TEGTMEYER

Attesting Officer    Acting Commissioner of Patents and Trademarks